US009285225B2

(12) United States Patent
Pham et al.

(10) Patent No.: US 9,285,225 B2
(45) Date of Patent: Mar. 15, 2016

(54) USING MAGNETOMETER DATA TO CALCULATE ANGULAR RATE MEASUREMENT BIAS

(75) Inventors: Hung A. Pham, Oakland, CA (US); Hengliang Zhang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 791 days.

(21) Appl. No.: 13/610,719

(22) Filed: Sep. 11, 2012

(65) Prior Publication Data
US 2014/0074424 A1    Mar. 13, 2014

(51) Int. Cl.
*G01P 3/00* (2006.01)
*G01C 21/16* (2006.01)
*G01C 25/00* (2006.01)

(52) U.S. Cl.
CPC .............. *G01C 21/165* (2013.01); *G01C 25/00* (2013.01)

(58) Field of Classification Search
CPC ......... H04W 64/00; G01C 21/28; G06T 7/20; G06T 7/004; G08B 21/0236; G01D 7/00; H04B 1/3827; H04H 20/71
See application file for complete search history.

(56) References Cited

U.S. PATENT DOCUMENTS

| 7,782,358 B2 * | 8/2010 | Nieminen et al. ............. 348/77 |
| 8,751,063 B2 * | 6/2014 | Bernstein et al. ................ 701/2 |

* cited by examiner

*Primary Examiner* — Elias Desta
(74) *Attorney, Agent, or Firm* — Fish & Richardson P.C.

(57) ABSTRACT

Implementations are disclosed for using magnetometer measurements to estimate bias for angular rate measurements provided by an angular rate sensor (e.g., a gyro sensor). In some implementations, a bias estimator running on a device is configured to determine if the device is rotating based on the magnetometer measurements. If the device is not rotating, a dynamic bias is calculated and added to a temperature compensated static bias to provide a total angular rate measurement bias. The total angular rate measurement bias can be provided to an attitude estimation system where it is used to update an attitude (orientation) of the device. In some implementations, the angular rate measurements are used to determine if the device is oscillating according to a threshold value. If the device is not rotating and the device is oscillating according to a threshold value, the static bias is updated in a calibration table.

20 Claims, 3 Drawing Sheets

USING MAGNETOMETER DATA TO CALCULATE ANGULAR RATE MEASUREMENT BIAS

TECHNICAL FIELD

This disclosure relates generally to calibrating sensor measurements on mobile devices.

BACKGROUND

Angular rate sensors are used to measure the rotational velocity of an object without a fix point for referencing. A Micro-Electro-Mechanical System (MEMS) angular rate sensor (or MEMS gyro) can be incorporated into mobile devices due to its small size, weight and low cost. The principle of operation is based on the Coriolis effect. A MEMS resonantor is driven at a certain frequency (e.g., about 10 kHz). Due to the angular rate the Coriolis force excites a second oscillation perpendicular to the first one. This oscillation is proportional to the angular rate and can be measured using capacitive methods. Application examples include but are not limited to: image stabilisation (e.g., in cameras or mobile phones); input devices for virtual reality applications; platform stabilisation; sensors for game consoles; and sensors for navigation systems.

The MEMS gyro is susceptible to bias, scale factor errors, and axis cross-sensitivities, as well as high frequency noise. Cross-axis sensitivity is strongly affected by mounting stresses, while the magnitudes of the bias and scale factor errors are related to external temperature. Calibration using measurements at known angular rates can be used to determine the cross-axis sensitivity. To mitigate the effects of gyro bias due to external temperature, the gyro bias can be estimated and subtracted from the raw gyro data. Changes in gyro bias, however, may not vary linearly with temperature, resulting in inaccurate estimates of gyro bias if the non-linearity is not accounted for in the estimation.

SUMMARY

Implementations are disclosed for using magnetometer measurements to estimate bias for angular rate measurements provided by an angular rate sensor (e.g., a gyro sensor). In some implementations, a bias estimator running on a device is configured to determine if the device is rotating based on the magnetometer measurements. If the device is not rotating, a dynamic bias vector is calculated and added to a temperature compensated static bias vector to provide a total angular rate measurement bias vector. The total angular rate measurement bias vector can be provided to an attitude estimation system where it is used to update an attitude (orientation) of the device. In some implementations, the angular rate measurements are used to determine if the device is oscillating according to a threshold value. If the device is not rotating and is oscillating according to the threshold value, the temperature compensated static bias vector is updated in a calibration table.

Particular implementations provide one or more of the following advantages. Magnetometer measurements are used to determine when a device is not rotating and thus identify an opportunity to estimate a dynamic bias vector for calibrating angular rate measurements provided by an angular rate sensor of the device. To prevent inaccurate bias estimates due to the bias varying non-linearly with temperature, a two-part scheme is used where a temperature compensated static bias vector is added to a dynamic bias vector to provide a total bias vector that is used to calibrate the angular rate measurements.

The details of the disclosed implementations are set forth in the accompanying drawings and the description below. Other features, aspects, and advantages of calibrating sensor measurements on mobile devices will become apparent from the description, the drawings, and the claims.

DETAILED DESCRIPTION

Exemplary Attitude Estimation System

Figure 1:
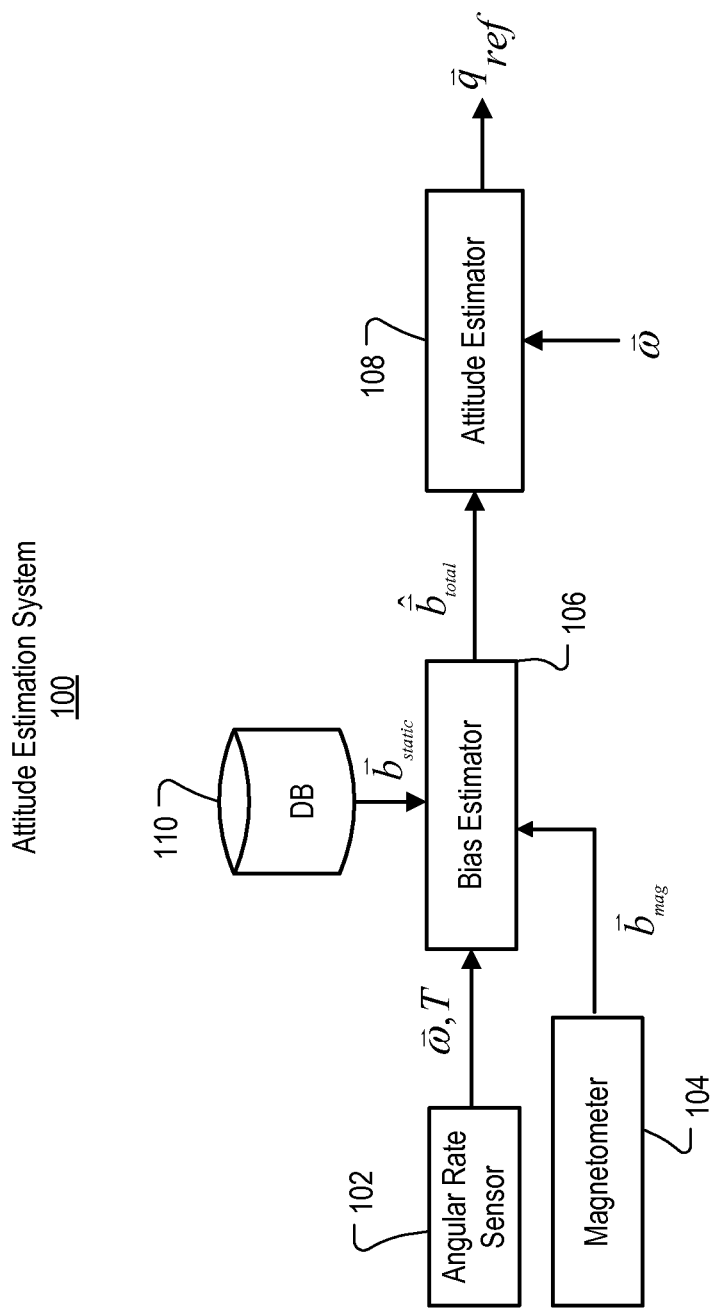
FIG. 1 is a block diagram of an exemplary attitude estimation system.

FIG. 1 is a block diagram of an exemplary attitude estimation system 100. In some implementations, system 100 can include an angular rate sensor 102 (e.g., a MEMS gyro sensor), magnetometer 104, bias estimator 106, attitude estimator 108 and calibration database 110. System 100 can be incorporated in a variety of mobile devices, including but not limited to: a handheld computer, a personal digital assistant (PDA), a cellular telephone, an electronic tablet, a network appliance, a digital camera, a video camera, a smart phone, an enhanced general packet radio service (EGPRS) mobile phone, a media player, a navigation device, an email device, a game console, or a combination of any two or more of these devices. In some implementations, some or all of the components of system 100 can be included on one or more integrated circuit (IC) chips.

In some implementations, an attitude of a device can be updated using body angular rates. The body angular rates can be represented by angular rate vector $\vec{\omega}$. The components of the angular rate vector $\vec{\omega}$ represents angular rates in the x, y and z axes, respectively, in a local coordinate frame of the device. In some implementations, the angular rate vector $\vec{\omega}$ can be measured using three MEMS gyros, one gyro on each of the x, y and z-axes of the local coordinate frame.

Generally, the attitude of the device can be represented by a reference quaternion $\vec{q}_{ref}$ as follows:

$$\vec{q}_{ref} = [q_x \ q_y \ q_z \ q_w]^T, \quad (1)$$

$$q_w = \cos\left(\frac{f}{2}\right)$$

$$q_x = J_x \sin\left(\frac{f}{2}\right)$$

$$q_y = J_y \sin\left(\frac{f}{2}\right)$$

$$q_z = J_z \sin\left(\frac{f}{2}\right)$$

where $\vec{j}$ = unit vector along axis of rotation, f = total rotation angle.

A reference quaternion change rate formulation based on a small angle approximation is given by $$\begin{bmatrix} \dot{q}_x \\ \dot{q}_y \\ \dot{q}_z \\ \dot{q}_w \end{bmatrix} = \frac{1}{2} \begin{bmatrix} q_w & -q_z & -q_y \\ q_z & q_w & -q_x \\ q_y & q_x & q_w \\ -q_x & -q_y & -q_z \end{bmatrix} \begin{bmatrix} \omega_x \\ \omega_y \\ \omega_z \end{bmatrix} dt. \quad (2)$$

Equation (2) can be integrated in discrete time to obtain the final attitude of the device represented by reference quaternion $\vec{q}_f$.

The angular rate vector $\vec{\omega}$ is output from angular rate sensor 102 and input to bias estimator 106. Additionally, a current temperature T of the device is used to look up a static bias $\vec{b}_{static}$ from a calibration table stored in calibration database 110. The static bias $\vec{b}_{static}$ is modeled as a linear relationship with temperature. The temperature T can be provided by a temperature sensor in angular rate sensor 102. In some implementations, the angular rate vector $\vec{\omega}$ can be scale-corrected before input into bias estimator 106.

A static bias vector is calculated using Equations [2]-[4] as follows. First, an angular rate bias versus temperature slope, m, per axis is calculated by Equation [2]:

$$m = [n\Sigma_{i=1}^n T_i^2 - (\Sigma_{i=1}^n T_i)^2] / [n\Sigma_{i=1}^n (\omega_i T_i) - (\Sigma_{i=1}^n T_i)(\Sigma_{i=1}^n \omega_i)], \quad (2)$$

where $\omega_i$ is the $i^{th}$ angular rate measurement associated with the $i^{th}$ temperature measurement $T_i$ in the calibration table.

Next, an angular rate bias versus temperature offset, b, is calculated per axis from Equation [3]:

$$b = [n\Sigma_{i=1}^n T_i^2 - (\Sigma_{i=1}^n T_i)^2][(\Sigma_{i=1}^n T_i^2)(\Sigma_{i=1}^n \omega_i) - (\Sigma_{i=1}^n T_i)(\Sigma_{i=1}^n \omega_i T_i)]. \quad (3)$$

The slope vector $\vec{m}$ and temperature bias offset vector $\vec{b}$ define a linear model that describes a static bias vector $\vec{b}_{static}$ for a given temperature T given by:

$$\vec{b}_{static} = \vec{m} * T + \vec{b} \quad (4)$$

A dynamic bias vector $\vec{\beta}$ can then be defined by the difference between the true bias vector $\vec{b}_{true}$ at a given time and the static bias vector $\vec{b}_{static}$ as follows:

$$\vec{\beta} = \vec{b}_{true} - \vec{b}_{static} \quad (5)$$

where the static bias vector $\vec{b}_{static}$ accounts for the bias over a long period of time and the dynamic bias vector $\vec{\beta}$ accounts for un-modeled and time varying biases. When the device is not rotating, the dynamic bias vector $\vec{\beta}$ is equal to the static angular rate vector $\vec{\omega}_{static}$. Per Equation [5], adding the dynamic bias vector $\vec{\beta}$ to the static bias vector $\vec{b}_{static}$ gives an estimated total bias vector $\hat{b}_{total}$, as described below in reference to FIG. 2

An estimated angular rate vector $\hat{\omega}$ can be computed by subtracting the estimated total bias vector $\vec{b}_{total}$ from the angular rate vector $\vec{\omega}$ when not rotating. When rotating, the reference quaternion, $\vec{q}_{ref}$, can be propagated in time using the estimated angular rate vector $\hat{\omega}$ as:

$$q_{delta} = \left[\sin(|\hat{\omega}| * \frac{dt}{2}) * \frac{\hat{\omega}}{|\hat{\omega}|}, \cos(|\hat{\omega}| * \frac{dt}{2})\right], \quad (6)$$

$$\vec{q}_{ref} = q_{delta} \otimes \vec{q}_{ref},$$

where $\otimes$ indicates quaternion multiplication. In some implementations, $\hat{\omega}$ can be estimated using an estimation filter, such as a Kalman filter, which takes into account measurement noise from angular rate sensor 102.

Exemplary Bias Estimation Process

Figure 2:
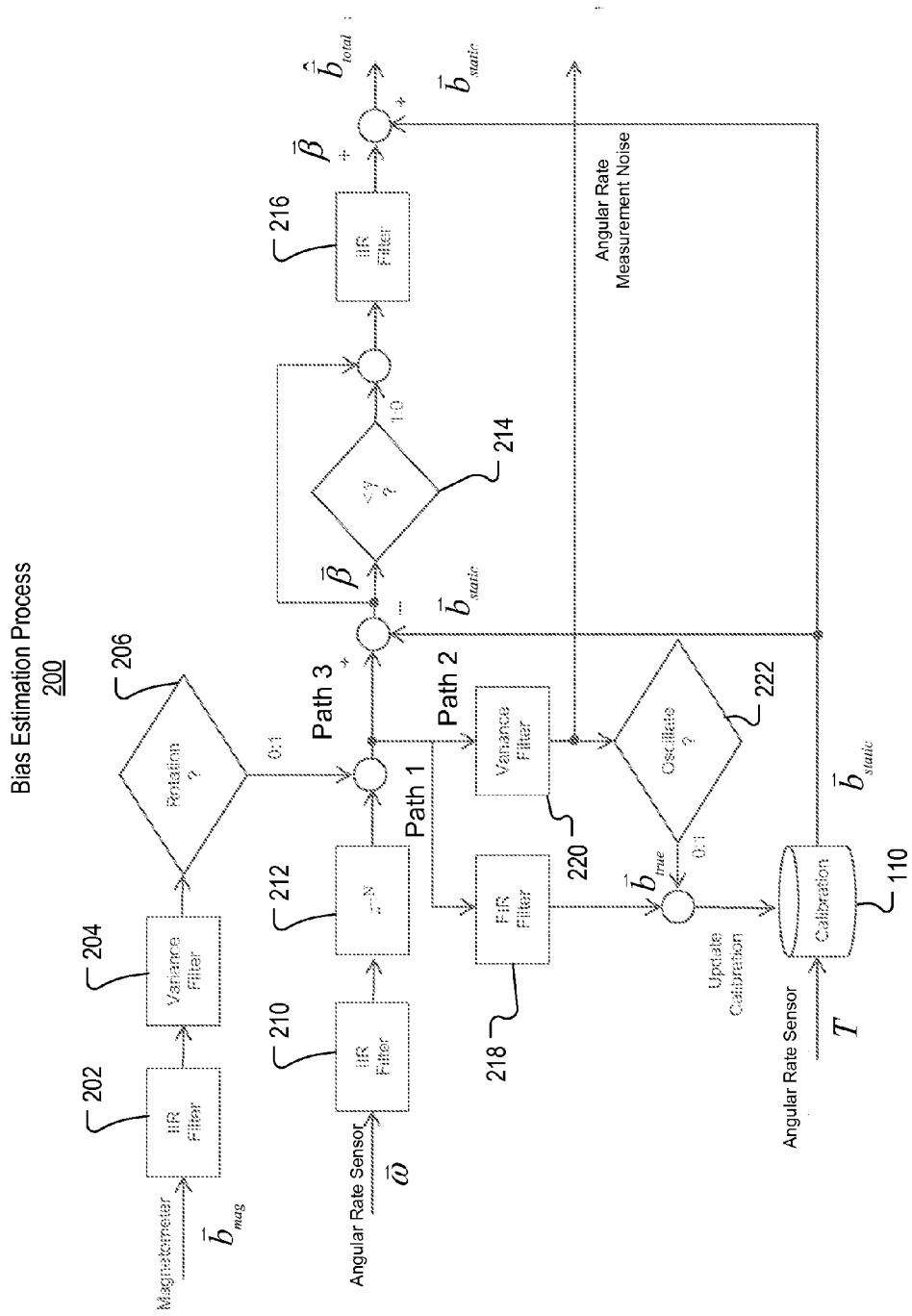
FIG. 2 is a flow diagram of an exemplary bias estimation process.

FIG. 2 is a flow diagram of an exemplary bias estimation process 200 performed by bias estimator 106 of FIG. 1. The dynamic bias vector $\vec{\beta}$ is calculated when the device is not undergoing rotation. Angular rate sensor 102 can detect when the device is oscillating, but cannot disambiguate constant rotations. Magnetometer 104 can sense variations in the Earth's geomagnetic field (to infer constant rotations) but may provide inaccurate measurements due to interference from neighboring magnetic fields. Bias estimation process 200 couples angular rate sensor 102 and magnetometer 104 to detect reliably oscillations and constant rotations of the device, while avoiding estimation errors due to magnetic field interference.

In some implementations, bias estimation process 200 can process magnetometer measurements using Infinite Impulse Response (IIR) filter 202 and variance filter 204. Magnetometer 104 outputs raw measurements $\vec{b}_{mag}$, which are conditioned by IIR filter 202 and variance filter 204. IIR filter 202 is configured to suppress sample noise in the magnetometer measurements and high frequency magnetic field interference (e.g., from switching or AC currents due to nearby electronics). Variance filter 204 is configured to suppress interference from nearby steady-state magnetic fields (e.g., speaker magnets). Variance filter 204 rejects constant bias offsets (removes the DC component) without sacrificing sensitivity to device motion.

The output of variance filter 204 is used to determine (206) if the device is rotating. In some implementations, if the output of variance filter 204 exceeds a predefined threshold value for at least a predefined duration value, the device is assumed not to be under constant rotation. The predefined values can be determined empirically.

Process 200 conditions angular rate measurements from an angular rate sensor (e.g., a gyro sensor) using IIR filter 210. IIR filter 210 is configured to suppress sample noise in the angular rate measurements. Because the application of variance filter 204 and IIR filters 202, 210, will introduce different phase lag to the magnetometer measurements and angular rate measurements, a zero-order-hold 212 is coupled to the output of IIR filter 210 to synchronize the magnetometer and angular rate measurements. The number of samples to hold the angular rate measurements (given by the variable N in FIG. 2), can be calculated from the accumulated estimated phase distortion from variance filter 204 and IIR filters 202, 210.

Path 1 shown in FIG. 2 includes FIR filter 218. If process 200 determines (222) that the device is oscillating according to a threshold value, the angular rate measurements (equivalent to a true bias when the device is not rotating) are passed through FIR filter 218 to remove "random walk" and then stored in calibration database 110.

Path 2 shown in FIG. 2 includes variance filter 220 for rejecting constant bias offsets in the angular rate measurements when the device is not rotating (removes the DC component). The output of variance filter 220 is used to determine if the device is oscillating according to a threshold value. If the device is oscillating according to a threshold value (e.g., based on the magnitude or amplitude of the oscillations), the angular rate measurements output by FIR filter 218 are inserted into a calibration table in calibration database 110. The angular rate measurements (true bias when the device is not rotating) are used with temperature measurements to update static bias vectors according to Equations [2]-[4].

Oscillation threshold(s) can be determined based upon user-studies. For example, user studies can be conducted to determine what oscillations should be expected if the user is trying to hold the device in-hand. For Path 2 described above, the device should be as stationary as possible (e.g., on a table or mounted in a vehicle). In some implementations, the device is oscillating according to a threshold value when the output of variance filter 220 is less than a threshold value or is within a range of threshold values.

Path 3 shown in FIG. 2 is used to update the dynamic bias vector $\vec{\beta}$ if process 200 determines (214) that the oscillations in the angular rate measurements are smaller than a predefined threshold value, $\gamma$ which can be determined empirically. The threshold $\gamma$ allows the calculation of dynamic bias estimates to include small, zero-mean motions of the device. Oscillations along path 3 are assumed to have zero-mean and are expected during some use scenarios (e.g., driving or taking a photo) where it is desirable for the bias estimator 106 to run.

The input to IIR filter 216 is the dynamic bias vector $\vec{\beta}$, which is derived from subtracting the static bias vector $\vec{b}_{static}$ from the output of zero-order-hold 212. IIR filter 216 is configured to filter out small device motions while capturing the time-varying nature of the dynamic bias.

The output of IIR filter 216 is added to the static bias vector $\vec{b}_{static}$ to generate the total angular rate measurement bias vector $\vec{b}_{total}$. The output of bias estimator 106 is: (1) the total estimate of angular rate measurement bias $\vec{b}_{total}$ (static+dynamic), and (2) angular rate measurement noise, which can be used to dynamically update estimation filter gains (e.g., Kalman filter gains used for attitude estimation).

Exemplary Device Architecture

Figure 3:
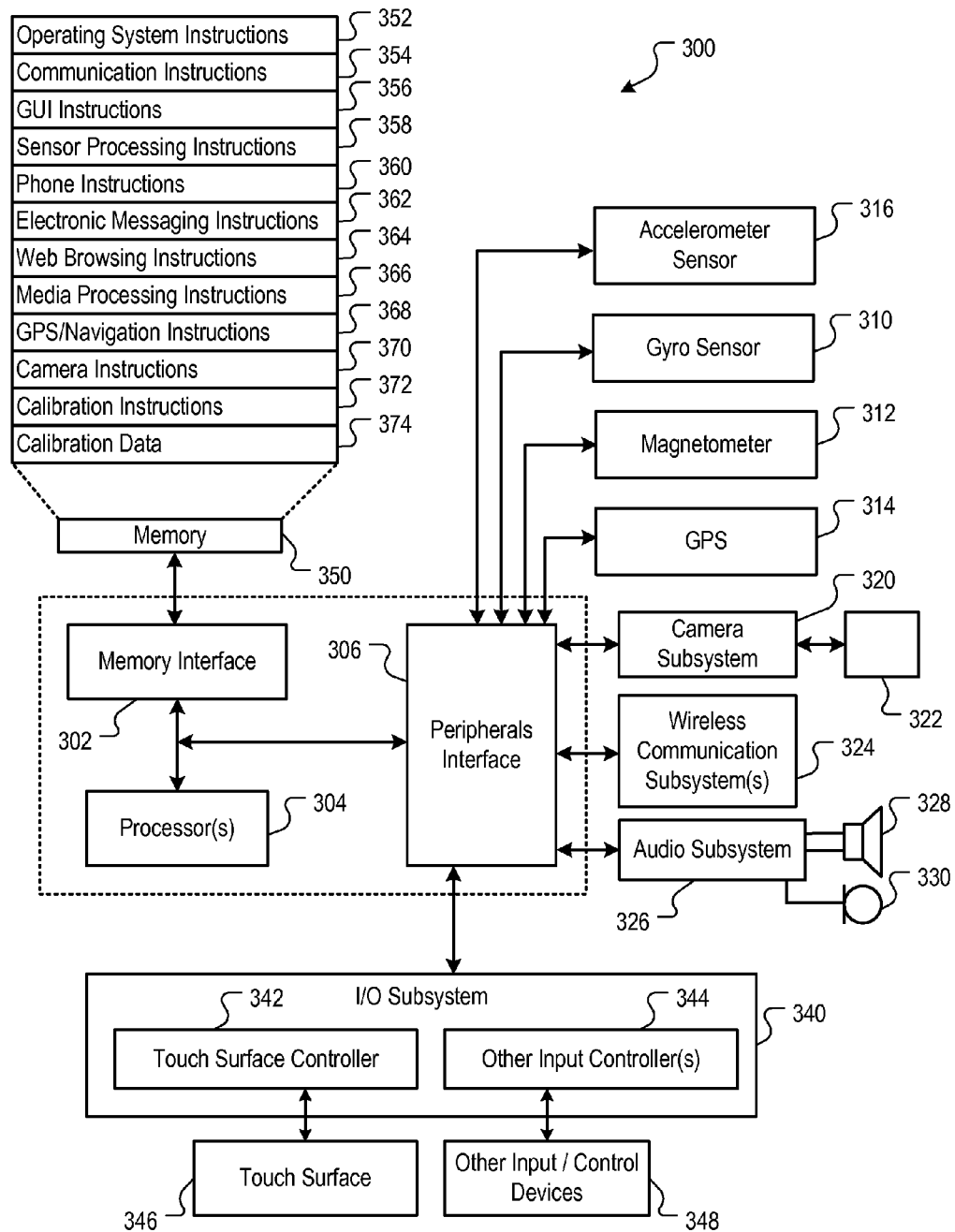
FIG. 3 is a block diagram of exemplary hardware architecture for implementing the system and processes referenced in FIGS. 1 and 2.

FIG. 3 is a block diagram of an exemplary device hardware architecture 300 for implementing system 100 and the processes described in reference to FIGS. 1 and 2. The architecture 300 can include memory interface 302, one or more data processors, image processors and/or processors 304, and peripherals interface 306. Memory interface 302, processor(s) 304 and/or peripherals interface 306 can be separate components or can be integrated in one or more integrated circuits. The various components in the device, for example, can be coupled by one or more communication buses or signal lines.

Sensors, devices, and subsystems can be coupled to peripherals interface 306 to facilitate multiple functionalities. For example, angular rate sensor 310 (e.g., a MEMS gyro), magnetometer sensor 312 and location processor 314 (e.g., GPS receiver) can be connected to peripherals interface 306 to provide geo-positioning. Accelerometer 316 can also be connected to peripherals interface 306 to provide data that can be used to determine change of speed and direction of movement of the mobile device.

Camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which a mobile device is intended to operate. For example, a mobile device can include communication subsystems 324 designed to operate over a GSM network, a GPRS network, an EDGE network, a Wi-Fi or WiMax network, and a Bluetooth network. In particular, the wireless communication subsystems 324 can include hosting protocols such that the mobile device can be configured as a base station for other wireless devices.

Audio subsystem 326 can be coupled to a speaker 328 and a microphone 330 to facilitate voice-enabled functions, such as voice recognition, voice replication, digital recording, and telephony functions.

I/O subsystem 340 can include touch surface controller 342 and/or other input controller(s) 344. Touch surface controller 342 can be coupled to a touch surface 346. Touch surface 346 and touch surface controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 346.

Other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of speaker 328 and/or microphone 330.

In one implementation, a pressing of the button for a first duration may disengage a lock of the touch surface 346; and a pressing of the button for a second duration that is longer than the first duration may turn power to the device on or off. The user may be able to customize a functionality of one or more of the buttons. The touch surface 346 can be used to implement virtual or soft buttons and/or a keyboard.

In some implementations, the device can present recorded audio and/or video files, such as MP3, AAC, and MPEG files. In some implementations, the device can include the functionality of an MP3 player.

Memory interface 302 can be coupled to memory 350. Memory 350 can include high-speed random access memory and/or non-volatile memory, such as one or more magnetic disk storage devices, one or more optical storage devices, and/or flash memory (e.g., NAND, NOR). Memory 350 can store operating system 352, such as Darwin, RTXC, LINUX, UNIX, OS X, WINDOWS, or an embedded operating system such as VxWorks. Operating system 352 may include instructions for handling basic system services and for performing hardware dependent tasks. In some implementations, operating system 352 can include a kernel (e.g., UNIX kernel). Operating system 352 can implement one or more of the processes described in reference to FIGS. 1 and 2.

Memory 350 may also store communication instructions 354 to facilitate communicating with one or more additional devices, one or more computers and/or servers. Memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; and camera instructions 370 to facilitate camera-related processes and functions. The memory 350 may also store other software instructions (not shown), such as security instructions, web video instructions to facilitate web video-related processes and functions, and/or web-shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 350. Memory 350 can include instructions 372 for performing angular rate measurement calibration and calibration data 374 (e.g., calibration database 110), as described in reference to FIGS. 1 and 2.

Each of the above identified instructions and applications can correspond to a set of instructions for performing one or more functions described above. These instructions need not be implemented as separate software programs, procedures, or modules. Memory 350 can include additional instructions or fewer instructions. Furthermore, various functions of the mobile device may be implemented in hardware and/or in software, including in one or more signal processing and/or application specific integrated circuits.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer includes one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Some examples of communication networks include a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving magnetometer measurements from a magnetometer of a mobile device;
   determining that the device is not rotating based on the magnetometer measurements;
   responsive to the determining, estimating a dynamic bias;
   estimating an angular rate measurement bias based on the dynamic bias and a temperature compensated static bias; and
   calibrating an angular rate measurement using the estimated angular rate measurement bias.

2. The method of claim 1, where determining that the device is not rotating based on the magnetometer measurements, further comprises:
   filtering the magnetometer measurements with a variance filter;
   comparing the filtered magnetometer measurements with a threshold value; and
   determining that the device is not rotating based on results of the comparing.

3. The method of claim 1, further comprising:
   receiving angular rate measurements from an angular rate sensor of the mobile device;
   determining that the mobile device is oscillating according to a threshold value based on the angular rate measurements; and
   updating the static bias based on previous angular rate and temperature measurements.

4. The method of claim 3, where determining that the mobile device is oscillating according to a threshold value further comprises:
   filtering the angular rate measurements with a variance filter; and
   comparing the filtered angular rate measurements with the threshold value.

5. The method of claim 3, further comprising:
   synchronizing the magnetometer and angular rate measurements; and
   estimating the angular rate measurement bias based on the synchronized magnetometer and angular rate measurements.

6. The method of claim 1, further comprising:
   filtering the magnetometer measurements with a first filter to suppress sample noise or high frequency magnetic field interference.

7. The method of claim 6, further comprising:
   filtering the magnetometer measurements with a second filter to reject a constant bias in the magnetometer measurements while maintaining sensitivity to device motion.

8. The method of claim 3, where synchronizing the magnetometer and angular rate measurements, further comprises:
   applying a zero-order-hold to a number of angular rate measurements.

9. The method of claim 8, where the number of angular rate measurements held by the zero order hold is based on an accumulated estimated phase distortion resulting from filters applied to the magnetometer and angular rate measurements.

10. The method of claim 1, where the angular rate sensor is a gyroscopic sensor.

11. A mobile device comprising:
    a magnetometer;
    an angular rate sensor;
    one or more processors;
    memory coupled to the one or more processors and configured to store instructions, which, when executed by the one or more processors, causes the one or more processors to perform operations comprising:
        receiving magnetometer measurements from the magnetometer of the mobile device;
        determining that the mobile device is not rotating based on the magnetometer measurements;
        responsive to the determining, estimating a dynamic bias;
        estimating an angular rate measurement bias based on the dynamic bias and a temperature compensated static bias; and
        calibrating an angular rate measurement provided by the angular rate sensor using the estimated angular rate measurement bias.

12. The mobile device of claim 11, where determining that the device is not rotating based on the magnetometer measurements, further comprises:
    filtering the magnetometer measurements with a variance filter;
    comparing the filtered magnetometer measurements with a threshold value; and
    determining that the device is not rotating based on results of the comparing.

13. The mobile device of claim 11, where the instructions, when executed by the one or more processors, causes the one or more processors to perform operations comprising:
    determining that the mobile device is oscillating according to a threshold value; and
    updating the static bias based on previous angular rate and temperature measurements.

14. The mobile device of claim 13, where determining that the mobile device is oscillating according to a threshold value comprises:
    filtering the angular rate measurements with a variance filter; and
    comparing the filtered angular rate measurements with the threshold value.

15. The mobile device of claim 13, where the instructions, when executed by the one or more processors, causes the one or more processors to perform operations comprising:
    synchronizing the magnetometer and angular rate measurements; and
    estimating the angular rate measurement bias based on the synchronized magnetometer and angular rate measurements.

16. The mobile device of claim 11, where the instructions, when executed by the one or more processors, causes the one or more processors to perform operations comprising:
    filtering the magnetometer measurements with a first filter to suppress sample noise or high frequency magnetic field interference.

17. The mobile device of claim 16, where the instructions, when executed by the one or more processors, causes the one or more processors to perform operations comprising:
    filtering the magnetometer measurements with a second filter to reject a constant bias in the magnetometer measurements while maintaining sensitivity to mobile device motion.

18. The mobile device of claim 13, where synchronizing the magnetometer and angular rate measurements, further comprises:
    applying a zero-order-hold to a number of angular rate measurements.

19. The mobile device of claim 18, where the number of angular rate measurements held by the zero order hold is based on an accumulated estimated phase distortion resulting from filters applied to the magnetometer and angular rate measurements.

20. The mobile device of claim 11, where the angular rate sensor is a gyroscopic sensor.

* * * * *